United States Patent
Wu

[19]

[11] Patent Number: 6,045,151
[45] Date of Patent: *Apr. 4, 2000

[54] SEAT MOUNTED SIDE AIR BAG WITH DEPLOYMENT FORCE CONCENTRATOR

[75] Inventor: Frank Wu, Novi, Mich.

[73] Assignee: Hoover Universal, Inc., Plymouth, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/808,572

[22] Filed: Feb. 28, 1997

[51] Int. Cl.⁷ .............................. B60R 21/20; B60R 21/22
[52] U.S. Cl. .................................. 280/728.3; 280/730.2; 297/216.13
[58] Field of Search .................. 280/730.2, 730.1, 280/728.3, 728.2, 728.1; 297/216.13, 216.1

[56] References Cited

U.S. PATENT DOCUMENTS

| | | | |
|---|---|---|---|
| 5,498,030 | 3/1996 | Hill et al. | 280/730.2 |
| 5,553,887 | 9/1996 | Karlow et al. | 280/730.2 |
| 5,630,615 | 5/1997 | Miesik | 280/730.2 |
| 5,639,111 | 6/1997 | Spencer et al. | 280/728.2 |
| 5,651,582 | 7/1997 | Nakano | 280/730.2 |
| 5,678,853 | 10/1997 | Maly | 280/730.2 |
| 5,762,363 | 6/1998 | Brown et al. | 280/730.2 |
| 5,816,610 | 10/1998 | Higashiura et al. | |
| 5,863,063 | 1/1999 | Harrell | |
| 5,927,749 | 7/1999 | Homier et al. | 280/730.2 |
| 5,967,603 | 10/1999 | Genders et al. | |

FOREIGN PATENT DOCUMENTS

| | | |
|---|---|---|
| 2185296 | 3/1997 | Canada . |
| 0 782 944 A1 | 7/1997 | European Pat. Off. . |
| 8258660 | 10/1996 | Japan . |
| 971212 | 3/1997 | Japan . |
| 2 293 355 A | 3/1996 | United Kingdom . |

*Primary Examiner*—Peter C. English
*Attorney, Agent, or Firm*—Harness, Dickey & Pierce, P.L.C.

[57] ABSTRACT

A seat assembly having a side air bag with a force concentrator at least partially surrounding the air bag to concentrate and direct the force of the inflating air bag to a designed deployment seam to cause the seam to rupture and allow the air bag to deploy therethrough. The force concentrator avoids the application of the air bag deployment force on the trim cover material and thus reduces the influence of the trim cover on the air bag deployment and prevents stretching of the trim cover. The force concentrator forms a non-stretchable structure at least partially surrounding the air bag which carries the air bag force and directs it to the deployment seam. This produces a consistent deployment of the air bag from one seat assembly to the next and also over time as the trim cover and seat wears.

8 Claims, 3 Drawing Sheets

SEAT MOUNTED SIDE AIR BAG WITH DEPLOYMENT FORCE CONCENTRATOR

BACKGROUND OF THE INVENTION

The present invention relates generally to a vehicle seat having a side air bag contained therein and in particular to such a seat with a force concentrator adjacent the air bag to concentrate the force of the inflating air bag at a designed seam in the trim cover to ensure deployment of the air bag through the seam.

In recent years, automobile manufacturers have directed increasing attention to providing improved side impact protection for vehicle occupants. One method of doing so is to provide an inflatable side air bag mounted to the vehicle seat and deployable between the seat occupant and the adjacent vehicle door or body structure. The side air bag (SAB) functions to dampen and distribute the impact load to reduce occupant injuries.

Generally, seat mounted SAB systems fall into two different categories, known as class A and class B. A class A side air bag deploys from a visible, discrete door on the outboard side of the seat back or seat cushion bolster. A class B side air bag is stowed beneath the seat trim cover and is designed to deploy through the trim cover. An advantage of the class A side air bag, is that deployment of the air bag through a door uses technology that has already been developed for frontal air bags in steering wheels and instrument panels. The technology for providing consistent and repeatable deployment of the air bag through the door is well developed. A disadvantage of a class A side air bag is that the air bag location is generally limited to the side of the seat so that the visible door is not a part of the seating surface engaged by a seat occupant. If it is desired for the air bag to deploy through the front corner of the seat back, such as the location of a bolster seam, a class A side air bag cannot be used. Rather, a class B side air bag must be used in which the air bag is underneath the seat back trim cover, and typically beneath a foam pad, where it does not adversely impact the seat comfort. However, with a class B side air bag, there are considerably more variables involved in providing consistent air bag deployment and in meeting the desired air bag in-position timing.

The seat trim cover provides numerous variables affecting air bag deployment. The trim cover fabric type, such as cloth, leather, vinyl, etc. and combinations of these various types, all behave differently and have different tensile and tear strengths. In addition, different materials of the same types, such as different cloth fabrics have different tensile strengths, tear strengths, weave, nap direction, etc. which can affect the manner in which an air bag deploys through the trim cover if the trim cover material is ruptured to deploy the air bag. Other variables introduced by the trim cover include the strength of the trim cover scrim layer or backing and the strength of the thin layer of foam that is typically laminated to the trim cover fabric.

Wear of the trim cover over time and trim cover damage by cutting, puncturing, cigarette burns, etc., also introduce variables in air bag deployment. For example, a cut in the trim cover at a location other than the intended deployment can cause the trim cover to rupture at the wrong location, resulting in the air bag being out of position.

Other variations in the deployment can be introduced by the density and type of the seat foam pad, the presence or absence of a border wire embedded in the foam pad, the trim cover attachment locations and types of attachments and misalignment of the trim cover on the seat back.

To reduce or eliminate the effects of the above variables, it is proposed to deploy a class B type SAB through a seam in the trim cover due to thread failure. Variables affecting the seam include the seam type, number of stitches per inch, thread strength, the seam arrangement, styling, welting, seam wear, ultraviolet exposure, etc. Most of these variables can be controlled in the design of the trim cover. As a result, greater deployment consistency can be achieved with deployment through a trim cover seam. However, even with designed deployment through a seam, the trim cover will introduce variations in SAB deployment.

It is an object of the present invention to design a vehicle seat having a side air bag with great air bag deployment consistency.

It is a further object of the invention to eliminate or minimize variability in air bag deployment introduced by the trim cover.

It is yet another object of the invention to provide a seat with a side air bag in which variability arising over time, caused by wear of and/or damage to the trim cover, does not affect the air bag deployment.

SUMMARY OF THE INVENTION

To accomplish the above objects, the seat assembly of the present invention employs a force concentrator that at least partially surrounds the folded air bag and concentrates, or directs, the force of the inflating air bag to the designed deployment seam to cause the thread to rupture and allow the air bag to deploy therethrough. The force concentrator also avoids the application of the air bag deployment load on the trim cover material and thus reduces the influence of the trim cover on the air bag deployment. Furthermore, the trim cover material is not stretched by the inflating air bag, which may otherwise increase the air bag in-position timing. Since the trim cover material is not loaded during deployment, consistent bag deployment can be achieved with a variety of different cover materials.

The force concentrator forms a non-stretchable structure surrounding, or at least partially surrounding, the air bag which carries the force of the inflating air bag and prevents the force from being applied to the trim cover. The force concentrator directs this force to the deployment seam to rupture the thread. This results in a consistent deployment of the air bag from one seat assembly to the next and removes the above factors, related to the trim cover, from the air bag deployment. In addition, the force concentrator provides for consistent deployment of the air bag over time as the trim cover wears since the concentrator is concealed and not subject to the wear.

Two separate embodiments of the force concentrator are disclosed in the present invention. In one embodiment, the force concentrator is in the form of a layer of sheet material joined to the inside of the trim cover. The force concentrating layer consists of panels of sheet material extending away from the deployment seam in opposite directions. The force concentrator is made of a sheet of a substantially non-stretchable material with a tensile strength sufficient to withstand the force of the inflating air bag without tearing. One successfully tested material for the force concentrator is the nylon material used to make air bags. Other high strength sheet materials may be used as well.

In another embodiment, the force concentrator is in the form of a sleeve or pocket of sheet material which entirely surrounds the air bag module. The sleeve extends from the module to the deployment seam in the trim cover where the two ends of the sheet material forming the sleeve are sewn into the trim cover on opposite sides of the deployment seam. The deploying air bag is contained within the sleeve until it ruptures the deployment seam. Again, the sleeve is made of a non-stretchable material having a tensile strength sufficient to withstand the force of the inflating air bag without tearing. Air bag material can be used in this embodiment as well.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
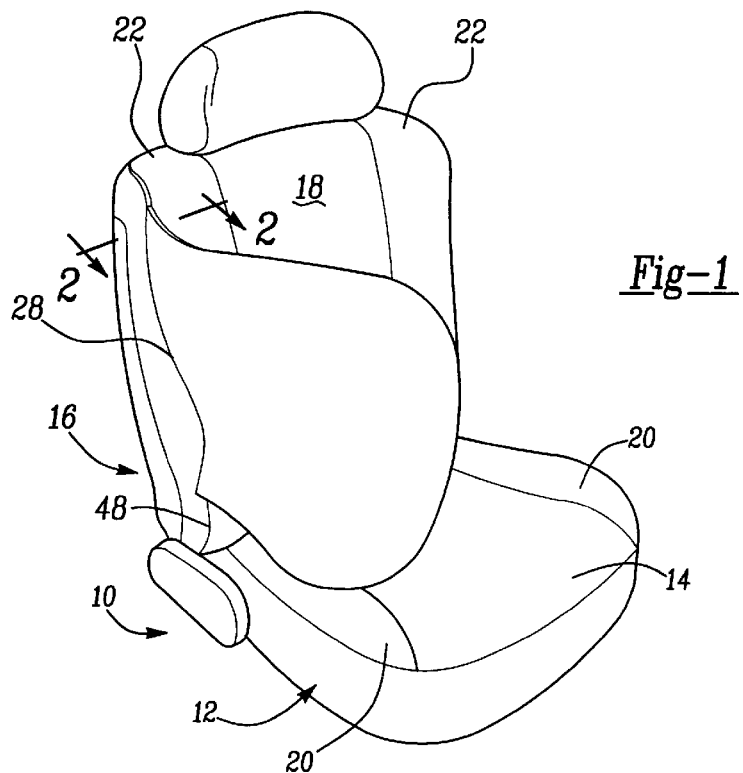
FIG. 1 is a perspective view of a vehicle seat assembly having a seat mounted SAB according to the present invention.

A seat assembly according to the present invention containing a side air bag (SAB) with the force concentrator of the present invention is shown in FIG. 1 and designated generally at 10. Seat assembly 10 includes a lower, generally horizontal, cushion assembly 12 forming a horizontal seating surface 14. A seat back cushion assembly 16 extends generally upwardly at the rear end of the lower cushion assembly 12. The seat back cushion assembly 16 forms an upright front seating surface 18 against which a seat occupant rests his/her torso. The lower cushion assembly has left and right side bolsters 20 and the seat back cushion assembly has left and right side bolsters 22. Both the lower cushion assembly 12 and the seat back cushion assembly 16 can be used to mount a SAB to provide additional occupant protection. The invention will be described below in the connection with the SAB mounted to the seat back cushion assembly.

The seat back cushion assembly 16 includes a trim cover 24 which is made of a plurality of pieces of a sheet material joined together at seams. Most notably, the trim cover includes a bolster seam 48 at the corner of the bolster as well as a side seam 28. The number and locations of the seams is determined partially by functional considerations to develop a tight, form fitting trim cover and also by stylistic considerations. Any appropriately located seam can be used for deployment of an SAB.

Figure 2:
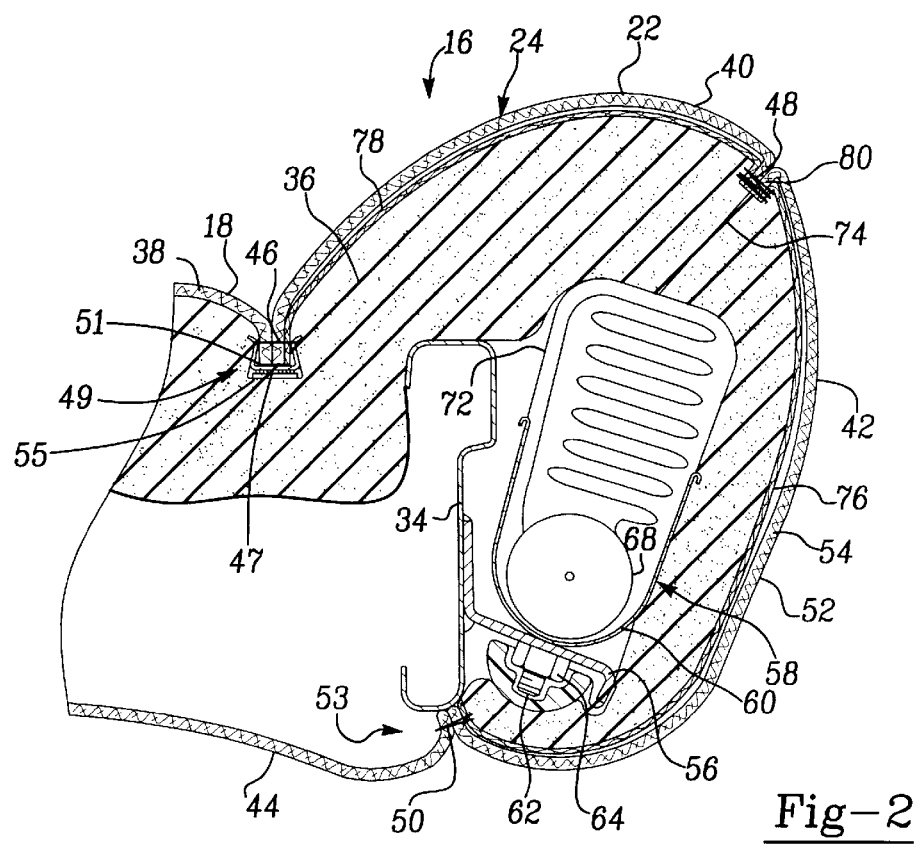
FIG. 2 is a sectional view of the seat back as seen from substantially the line 2—2 of FIG. 1 illustrating a first embodiment of the force concentrator of the present invention.

With reference to FIG. 2, one embodiment of the seat back and the force concentrator is shown in greater detail. The seat back cushion assembly 16 includes a frame 34 that provides the structural support for the cushion assembly. The frame 34 supports a pad 36 such as a urethane foam pad, rubberized hair pad etc. The pad is in turn covered with a trim cover 24. The portion of the trim cover 24 shown in FIG. 2 is constructed of four separate pieces of sheet material 38, 40, 42 and 44. These pieces are joined together by seams 46, 48 and 50. The seams are shown and described in the specification as being sewn with a thread. The specification is not limited to such a seam structure but includes other joining processes, such as but not limited to, staples, heat fusion, ultrasonic welding, adhesives, etc. The particular method of forming the seam is not critical to the present invention. As will be explained below, it is the strength of the seam that is important to the invention.

Seam 48 in FIG. 2 is the bolster seam at the corner of the side bolster 22. The sheet material of the trim cover 24 has multiple layers. An outer layer 52 is made of a flexible sheet material such as woven or knit fabric, leather, vinyl or other similar material and provides a finished appearance to the seat assembly. A thin foam sheet 54 (FIG. 3B) is typically laminated to the inner surface of the fabric layer 52. In addition, other backing materials may also be laminated or joined to the foam.

The trim cover is attached to the pad 36 at the seam 46 by a tie down 49. Tie down 49 consists of a hook and loop fastener having a loop tape 51 sewn on the inside of the seam 46 and a hook strip 55 joined to the pad 36 at the base of a trench 47. Such a tie down is common in seat covers. Other tie downs using wires, hog rings, clips, bungy cords, flipper tabs, etc. can be used as well. Any of a variety of different tie down structures can be used if they meet the strength requirements outlined below. The trim cover may also be attached at the rear of the seat back to the frame 34 or pad by a tie down 53. The rear tie down is typically not needed for proper functioning of the air bag. While the front tie down in needed more often, there are situations in which the front tie down may not be needed either, such as air bag deployment through a side seam. In such a case, the air bag load is lateral instead of forward.

A mounting bracket 56 is attached to the frame 34 and is used to mount the side air bag module 58. The air bag module 58 includes a housing 60 with one or more threaded studs 62 that pass through apertures (not shown) in the bracket 56 and are attached thereto by nuts 64.

The module 58 further includes a folded air bag 70 and an inflator 68 that provides gas for inflating the air bag 70. A thin sheet 72 forms a covering member which covers the folded air bag and holds the air bag in place during shipping and handling of the module. The sheet 72 is designed to rupture during deployment of the air bag without affecting the air bag deployment. The illustrated air bag module 58 is only exemplary of the many modules that could be used. The specific structure and components of the module illustrated do not form the present invention other than the folded, inflatable air bag. The bolster seam 48 is the seam through which the inflated air bag is designed to deploy. To assist the air bag in penetrating through the pad 36, the pad may be formed with a slot 74, or several spaced slots, between the air bag and the deployment seam to locally weaken the pad and encourage air bag deployment through the foam, toward the seam 48. Depending on the location of the deployment seam, it may be possible and preferred to position the air bag directly behind the trim cover without any pad covering the air bag. This would likely be the case where a side seam is used to deploy the air bag.

As the air bag inflates, it rapidly increases in volume and pushes outward on the foam pad and trim cover 24. This will cause stretching of the trim cover until either the trim cover itself or one of the seams in the trim cover fails, enabling the air bag to penetrate through the trim cover. Optionally, the trim cover may detach from the foam pad or frame at the tie downs 49 and 53, resulting in a condition referred to as "ballooning" where the inflated air bag is retained inside the trim cover. To avoid ballooning, the attachment of the trim cover to the foam pad at the tie downs must be strong enough to avoid detachment caused by the inflating air bag. A tie down at seam 46 is most often needed when the bolster seam is used by the air bag. If a side seam 28 is used for air bag deployment, a tie down at seam 46 may not be needed for proper function of the air bag.

To avoid stretching and tearing of the trim cover, the force concentrator of the present invention is used to concentrate the force on the seam 48. This avoids application of the inflation force to the trim cover itself and eliminates variability in deployment caused by the trim cover. The force concentrator includes two panels of sheet material 76 and 78. The panel 76 is joined to the trim cover at the seam 50 and extends around the module to the deployment seam 48 where it is sewn into that seam by the seam thread 80. The other panel 78 is joined to the trim cover at the seam 46 and extends from the seam 46 to the deployment seam 48 where it is also joined into the seam by the seam thread 80. The two panels 76 and 78 are made of a substantially non-stretchable material having a tensile strength sufficient to withstand the force of the inflating air bag without tearing. Examples of successfully used materials include 420 and 630 denier nylon air bag fabric. Other high strength sheet materials may be used as well.

As the air bag 70 inflates and increases in size, the panels 76 and 78 are loaded in tension but do not stretch and do not tear. This avoids loading of the trim cover in tension and stretching of the cover which could result in rupture of the trim cover. The seam 48 is constructed in a manner that the seam is substantially weaker than either of the panels 76 and 78. As a result, the seam will fail before the force concentrator panels fail. Since the two panels 76 and 78 are sewn into the seam 48, as the panels are loaded from the expanding air bag, the seam thread 80 is pulled and eventually fails. This allows the air bag to deploy through the ruptured seam. While there are variables that affect the seam strength, most of these are related to the seam design and thread type. Once a seam design and thread is chosen, there is little variation in seam strength from one seat assembly to the next. The thread strength is fairly uniform from one lot to the next, especially compared to the variability in fabric strength. Stitch type and the number of stitches per inch are also more uniformly controlled than the fabric strength. As a result, once deployment variables due to the trim cover have been eliminated, deployment through the seam is fairly consistent.

The panels 76 and 78 function to concentrate the air bag deployment force on the seam 48. While the panels 76 and 78 are shown attached to the trim cover solely by the seams 46, 48 and 50, it is possible to incorporate the concentrator panels into the trim cover material by laminating the concentrator panels to the trim cover material in addition to sewing the panels at the various seams. With the force concentrator laminated or otherwise joined to the trim cover material, the "seam" may be formed as a weakened zone in the trim cover. It is not limited to a joint between two separate trim cover pieces. If the weakened zone is aligned with a break in force concentrator and the force concentrator is joined to the trim cover on opposite sides of the weakened zone, then the inflation force of the air bag will be applied to the weakened zone of the trim cover.

While two panels 76, 78 have been shown, one on each side of seam 48, it may be possible to achieve the same function with a single panel on only one side of the deployment seam. Such a configuration will work if the air bag is located such that it would only rupture the trim cover on one side of the seam. By placing a force concentrator on that side, the force is directed to the seam to induce its failure. It must be verified that the addition of the concentrator does not induce trim cover failure elsewhere.

Figure 2A:
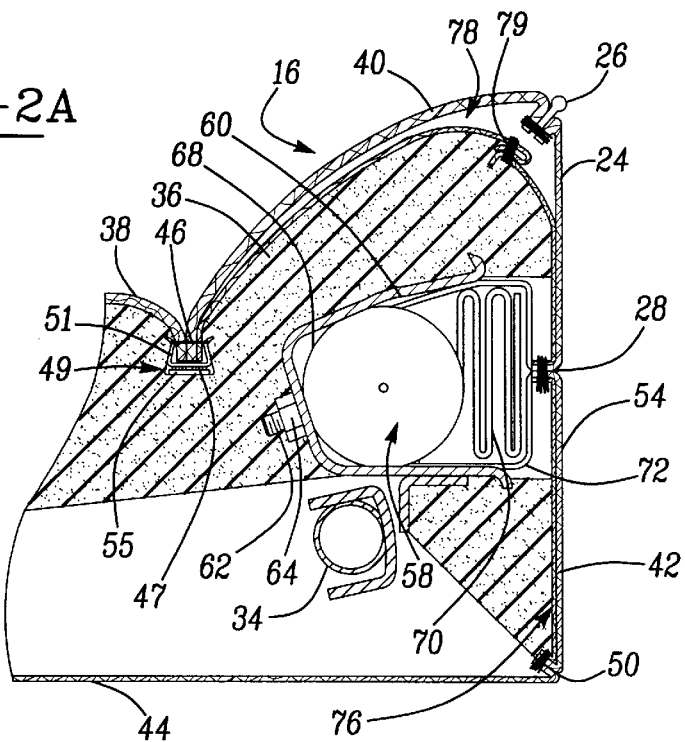
FIG. 2A is a sectional view similar to FIG. 2 showing a variation of the embodiment of FIG. 2.

With reference to FIG. 2A an alternative embodiment of the force concentrator of the present invention is shown and described. In FIG. 2A, the side air bag 70 is designed to deploy through a side seam 28 instead of the bolster seam 26. In such a configuration, it may be difficult to prevent the air bag from deploying through the bolster seam 26 which is located relatively close to the deployment seam 28. The force concentrator of the present invention is used to protect the seam 26 by having a panel 78 extend from the deployment seam 28 all the way to the seam 46 and the tie down 49. The panel 78 is not attached to the seam 26. In order to provide the desired fit, the force concentrator panel 78 may be made from multiple pieces joined together by a seam 79 which generally parallels the trim cover bolster seam 26. The seam 79 is provided to shape the force concentrator panel 78 to the contour of the foam pad 36 to produce the desired fit and finish and is designed to withstand the air bag inflation loads. Since the force concentrator panel 78 extends from the deployment seam 28 to the seam 46 and tie down 49, the inflation force of the air bag is not applied to the trim cover seam 26, thereby protecting the seam 26 and preventing unintended deployment of the air bag through that seam.

Figure 3:
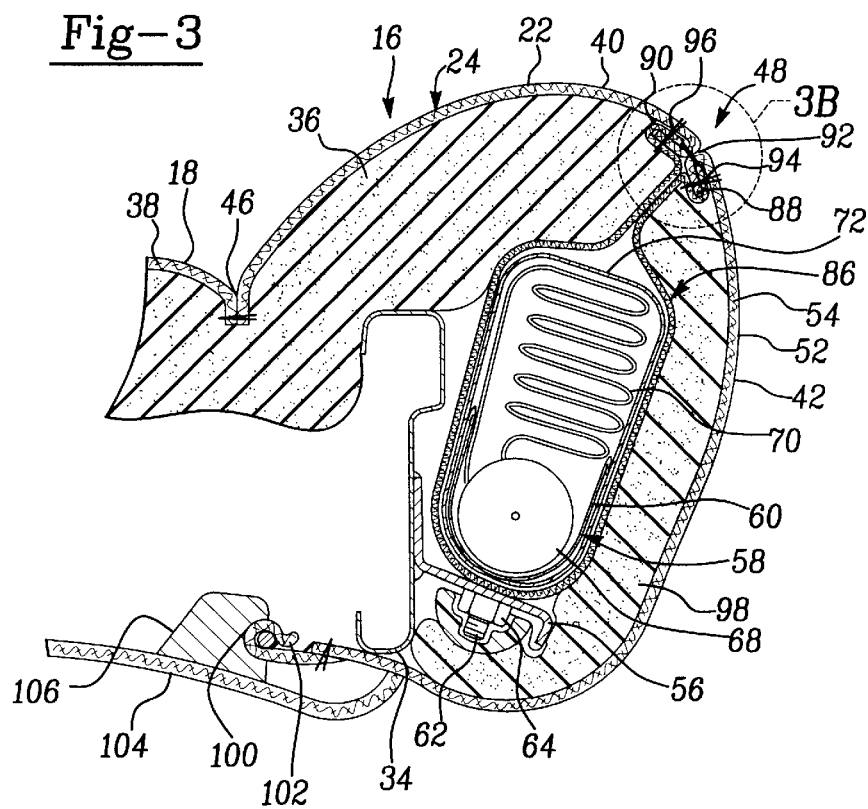
FIG. 3 is a sectional view as seen from substantially line 2—2 of FIG. 1 illustrating a second embodiment of the force concentrator of the present invention.
Figure 3A:
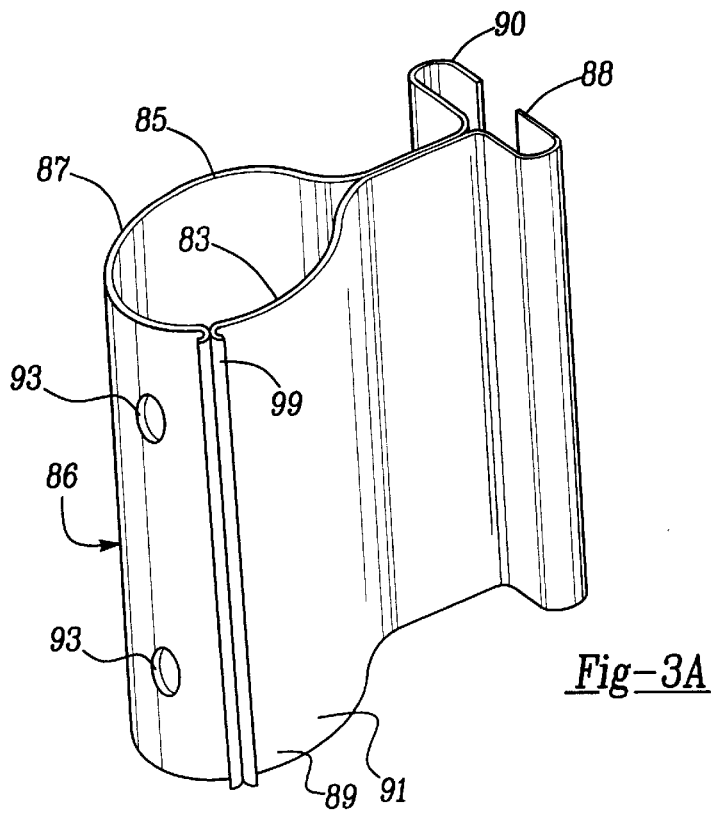
FIG. 3A is a perspective view of the sleeve forming the force concentrator.
Figure 3B:
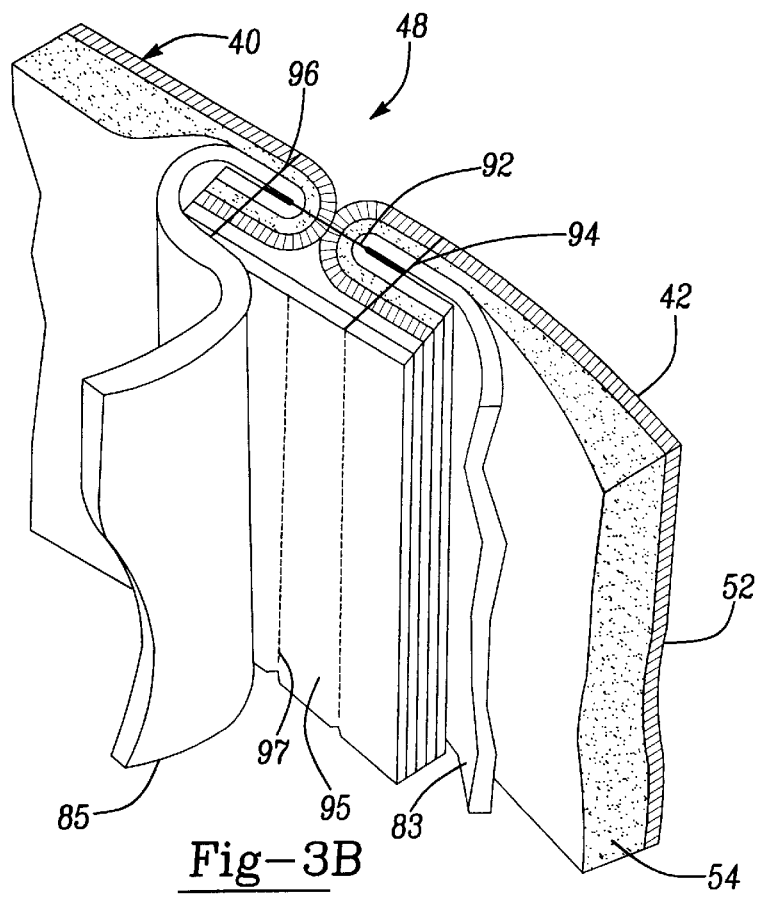
FIG. 3B is an enlargement of the circled area labeled 3B in FIG. 3.

With reference to FIGS. 3 and 3A, another embodiment of the invention is shown. Common elements with the embodiment shown in FIG. 2 have been assigned the same reference numerals. In this embodiment, the force concentrator is in the form of a sleeve or pocket 86 which surrounds the air bag module 58. The sleeve is of a tubular construction which is open at one or both of the top and bottom 87, 89 of the sleeve 86. The sleeve is made from two pieces 83 and 85 of sheet material 91. The sleeve 86 is wrapped around the module and extends forward through the foam in front of the air bag 70. The ends 88 and 90 of the sheet material pieces 83 and 85 are joined into the trim cover on opposite sides of the seam 48. The seam 48 is a French seam having a first thread 92 which joins the trim cover members 40 and 42 to one another. A second thread 94 is sewn through both the end 88 of the sleeve material piece 83 and the trim cover member 42, joining the sleeve end to the trim cover. Likewise, a third thread 96 joins the end 90 of the sleeve material piece 85 to the trim cover member 40 on the other side of the seam. A strip of perforated tape 95 (FIG. 3B) is also sewn in the seam by the threads, 94 and 96. This tape is commonly provided for cosmetic reasons to avoid see-through of the seams. The tape is perforated at 97 along the seam to facilitate deployment of the air bag through the tape. Following attachment of the two pieces 83 and 85 to the seam 48, the two pieces are then joined together at their opposite ends with the seam 99. The air bag module is placed within the sleeve and the mounting studs of the module extend through apertures 93 in the sleeve. While a French seam has been shown for attachment of the sleeve, a typical joint seam, such as the seam 48 shown in FIG. 2, could be used as well to attach the sleeve to the trim cover.

When the air bag 70 is inflated, it extends forward, between the two layers of the sleeve, toward the seam 48. As the air bag inflates, the sleeve material is loaded in tension. This tension pulls on the seam 48 until the seam thread 92 fails. By containing the inflating air bag within the sleeve 86, the pad 36 and the trim cover 24 are not loaded in tension by the inflating air bag. Rather, the sleeve 86 concentrates or directs the force of the inflating air bag directly on the thread 92 of seam 48.

The cushion assembly 16 is assembled by first sewing the sleeve 86 into the trim cover. As the trim cover is being applied over the seat back frame and pad, the inflator module is positioned within the sleeve 86 with the module studs 62 projecting rearward through apertures 93 in the sleeve. A foam pad 98 is placed on the side of the module to provide padding at the side of the seat back assembly. The trim cover is then wrapped over the pad 98 and attached to the seat back structure such as wire 100 by a J-clip or other fastener 102. The rear of the seat back is closed by a hard panel 104 which is also clipped to the wire 100 by mounting flanges 106. Hard back panels of this type are known in the vehicle seating art and do not form a part of the present invention. The seat back could be closed out with a fabric panel and zippers, Velcro®, or other fasteners instead of a hard panel 104.

In this and the previous embodiment, the force concentrator is joined to the trim cover by sewing. The invention is not limited to a sewn attachment of the force concentrator to the trim cover. Other joining methods can be used such as, but not limited to, adhesives, hook and loop fasteners, etc.

The seat assembly of the present invention provides a force concentrator to concentrate the force of an inflating air bag to a specific location in the trim cover, typically a seam. This ensures that the trim cover fails at the seam as opposed to another, unintended, location. As a result, more consistent air bag deployment is achieved.

It is to be understood that the invention is not limited to the exact construction illustrated and described above, but that various changes and modifications may be made without departing from the spirit and scope of the invention as defined in the following claims.

I claim:

1. A cushion assembly for a vehicle seat assembly comprising:

a pad;

a frame supporting the pad;

a trim cover at least partially surrounding the pad and frame, the trim cover having at least one seam therein and being made of a material having at least an outer layer;

an inflatable air bag and an inflator mounted to the frame, the air bag being at least partially covered by the pad and trim cover, the air bag, when inflated, projecting through the pad and trim cover;

a covering member disposed in covering relationship over said inflatable air bag for maintaining said inflatable air bag in a folded position;

one seam of the trim cover being aligned with the air bag for the air bag to deploy through the trim cover by rupturing the one seam; and a generally tubular force concentrating sleeve circumscribing the covering member, the air bag and the inflator, the sleeve being made of a flexible sheet of material having a tensile strength sufficient to withstand the force of the inflating air bag without tearing, the sheet being wrapped around the covering member, the air bag and inflator and the sheet having opposite ends which are brought together and joined to the trim cover on opposite sides of the one seam whereby the force of the inflating air bag is concentrated on the one seam to rupture the one seam to enable the air bag to deploy through the trim cover.

2. The cushion assembly according to claim 1 wherein the air bag and inflator are part of an integrated air bag module mounted to the frame and the force concentrating sleeve circumscribes the module and passes between the module and the frame.

3. The cushion assembly according to claim 1 wherein the sheet of material of the force concentrating sleeve is a woven nylon fabric.

4. The cushion assembly according to claim 1 wherein the force concentrating sleeve is made of an air bag fabric.

5. The cushion assembly according to claim 1 wherein the one seam of the trim cover is a sewn seam having a thread and the ends of the force concentrating sleeve are sewn into the seam by the seam thread.

6. The cushion assembly according to claim 1 wherein the one seam of the trim cover is a french seam having a seam thread joining two separate pieces of the trim cover together, a second thread attaching one sleeve end to the trim cover on one side of the seam thread and a third thread attaching the other sleeve end to the trim cover on the opposite side of the seam thread.

7. The cushion assembly according to claim 2 wherein the generally tubular sleeve has a top and a bottom and at least one of the top and bottom is open.

8. The cushion assembly according to claim 1 wherein the air bag, before inflation, is wholly contained within a space defined by the generally tubular force concentrating sleeve.

* * * * *